US012738798B2

(12) United States Patent
Koch et al.

(10) Patent No.: US 12,738,798 B2
(45) Date of Patent: Sep. 15, 2026

(54) ELECTRIC MOTOR

(71) Applicant: BorgWarner Inc., Auburn Hills, MI (US)

(72) Inventors: Silvio Koch, Kirchheimbolanden (DE); Benedikt Hummel, Zweibrücken (DE); Denis Delannoy, Mainz (DE); Sebastian Vorläufer, Einhausen (DE)

(73) Assignee: BORGWARNER INC., Auburn Hills, MI (US)

(*) Notice: Subject to any disclaimer, the term of this patent is extended or adjusted under 35 U.S.C. 154(b) by 205 days.

(21) Appl. No.: 18/761,693

(22) Filed: Jul. 2, 2024

(65) Prior Publication Data

US 2025/0030302 A1 Jan. 23, 2025

(30) Foreign Application Priority Data

Jul. 21, 2023 (DE) ......................... 102023119405.4

(51) Int. Cl.

| | |
|---|---|
| ***H02K 5/20*** | (2006.01) |
| ***H02K 5/173*** | (2006.01) |
| ***H02K 7/08*** | (2006.01) |
| ***H02K 9/19*** | (2006.01) |
| ***H02K 11/33*** | (2016.01) |
| ***H02K 21/22*** | (2006.01) |

(52) U.S. Cl.

CPC ........... *H02K 5/203* (2021.01); *H02K 5/1735* (2013.01); *H02K 7/085* (2013.01); *H02K 9/19* (2013.01); *H02K 11/33* (2016.01); *H02K 21/22* (2013.01); *H02K 2211/03* (2013.01)

(58) Field of Classification Search

CPC ...... H02K 5/203; H02K 5/1735; H02K 7/085; H02K 9/19; H02K 11/33; H02K 21/22; H02K 2211/03

See application file for complete search history.

(56) References Cited

U.S. PATENT DOCUMENTS

| | | | |
|---|---|---|---|
| 5,713,427 A | 2/1998 | Lutz et al. | |
| 10,270,315 B2 | 4/2019 | Desbiens et al. | |
| 2014/0265659 A1* | 9/2014 | Chamberlin ......... | H02K 5/1732 310/54 |

(Continued)

FOREIGN PATENT DOCUMENTS

| | | |
|---|---|---|
| CN | 211508749 U | 9/2020 |
| CN | 215871000 U | 2/2022 |

(Continued)

*Primary Examiner* — Sean Gugger
(74) *Attorney, Agent, or Firm* — Howard & Howard Attorneys PLLC

(57) ABSTRACT

An electric motor having a cooling channel which leads through an interior space surrounded by a stator and a housing comprises a first housing component, which forms a base opposite a first axial end of the stator, and a second housing component opposite a second axial end of the stator as a cover, and the first housing component has an inlet and an outlet for cooling liquid and an inner part which projects into the stator. The inner part forms a sleeve, in which the first end of the shaft is arranged, and the inner part also forms an annular space which is arranged between the stator and the sleeve, wherein a cooling channel section for cooling the stator extends in this annular space, and wherein at least one bearing of the shaft is arranged in the sleeve.

16 Claims, 4 Drawing Sheets

(56) References Cited

U.S. PATENT DOCUMENTS

| | | | | |
|---|---|---|---|---|
| 2017/0070106 | A1 | 3/2017 | Guo et al. | |
| 2018/0023580 | A1* | 1/2018 | Ishizaki | H02K 5/207 417/368 |
| 2018/0183309 | A1* | 6/2018 | Schroeder | H02K 7/083 |
| 2023/0268795 | A1* | 8/2023 | Khan | H02K 5/1732 310/54 |

FOREIGN PATENT DOCUMENTS

| | | | |
|---|---|---|---|
| CN | 216086347 | U | 3/2022 |
| DE | 4404791 | C1 | 3/1995 |
| DE | 102005004001 | A1 | 8/2006 |
| DE | 102006059135 | A1 | 6/2008 |
| DE | 102016116033 | A1 | 3/2017 |
| EP | 3091637 | B1 | 10/2018 |
| WO | WO2020127379 | A1 | 6/2020 |

* cited by examiner

ELECTRIC MOTOR

CROSS REFERENCE TO RELATED APPLICATIONS

This application claims the priority to German Patent Application No. DE102023119405.4 filed on Jul. 21, 2023, and the entire content of this priority application is incorporated herein by reference in its entirety.

TECHNICAL FIELD

The disclosure relates to an external rotor motor with an internally cooled stator. An electric motor according to the preamble of claim 1 is known, for example, from EP 3 091 637 B1.

BACKGROUND

External rotor motors with an internally cooled stator, i.e. a cooling channel that runs through an interior surrounded by the stator, enable high performance in combination with a very compact design. A constant goal in the development of external rotor motors is to combine high performance with a compact design and high speeds.

An object of at least some implementations of the present disclosure is to show a way in which this goal can be achieved even better.

This object is solved by an electric motor. Advantageous refinements of the disclosure are the matter of dependent claims.

SUMMARY

An electric motor may comprise a stator with stator windings, a rotor with permanent magnets surrounding the stator, a shaft coupled to the rotor, a housing which surrounds the rotor and the stator, and a cooling channel which leads through an interior space surrounded by the stator. The housing has a first housing component, which forms a base opposite a first axial end of the stator, and a second housing component, which forms a cover opposite a second axial end of the stator. The first housing component has an inlet and an outlet for cooling liquid as well as an inner part that projects into the stator. This inner part forms a sleeve, in which one end of the shaft and a bearing of the shaft are arranged, and an annular space, which is arranged between the stator and the sleeve and in which a cooling channel section for stator cooling runs.

In this way, the space surrounded by the stator can be used both for cooling the stator and for cooling the bearing of the shaft. In addition, the bearing of the shaft can be improved by arranging several bearings at a greater distance than is the case with the electric motor known from EP 3 091 637 B1, for example.

An insert can be arranged in the annular space. Such insert can then together with the inner part define the cooling channel section. However, it is also possible that this function of such an insert is taken over by the first housing component, i.e. the first housing component defines the cooling channel section without separate, additional components in its inner part.

The sleeve formed by the inner part can be integrally provided with a sleeve base, i.e. the first housing component forms both the sleeve and a sleeve base. In this case, the first housing component forms a pot in which one end of the shaft is arranged. Another possibility is that the sleeve base is a separate component that is attached to the first housing component.

An advantageous refinement of the disclosure provides that the shaft protrudes from the second housing component, i.e. the second housing component has an opening through which the shaft protrudes. In this way, the structure of the two housing components can be simplified. However, it is also possible for the first housing component to have an opening through which the shaft protrudes.

A further advantageous refinement of the disclosure may provide that the shaft has different diameters and the shaft is mounted in the sleeve with two bearings, wherein a first bearing, which is arranged closer to the end of the shaft lying in the sleeve than a second bearing, has a smaller internal bearing diameter than the second bearing. In this way, the shaft with its bearings can be mounted in a simple manner by insertion into the sleeve formed by the first housing component.

BRIEF DESCRIPTION OF THE DRAWINGS

Further details and advantages of the disclosure are explained with reference to the attached drawings. Identical and corresponding components are provided with corresponding reference signs in the various drawings.

DETAILED DESCRIPTION

Figure 1:
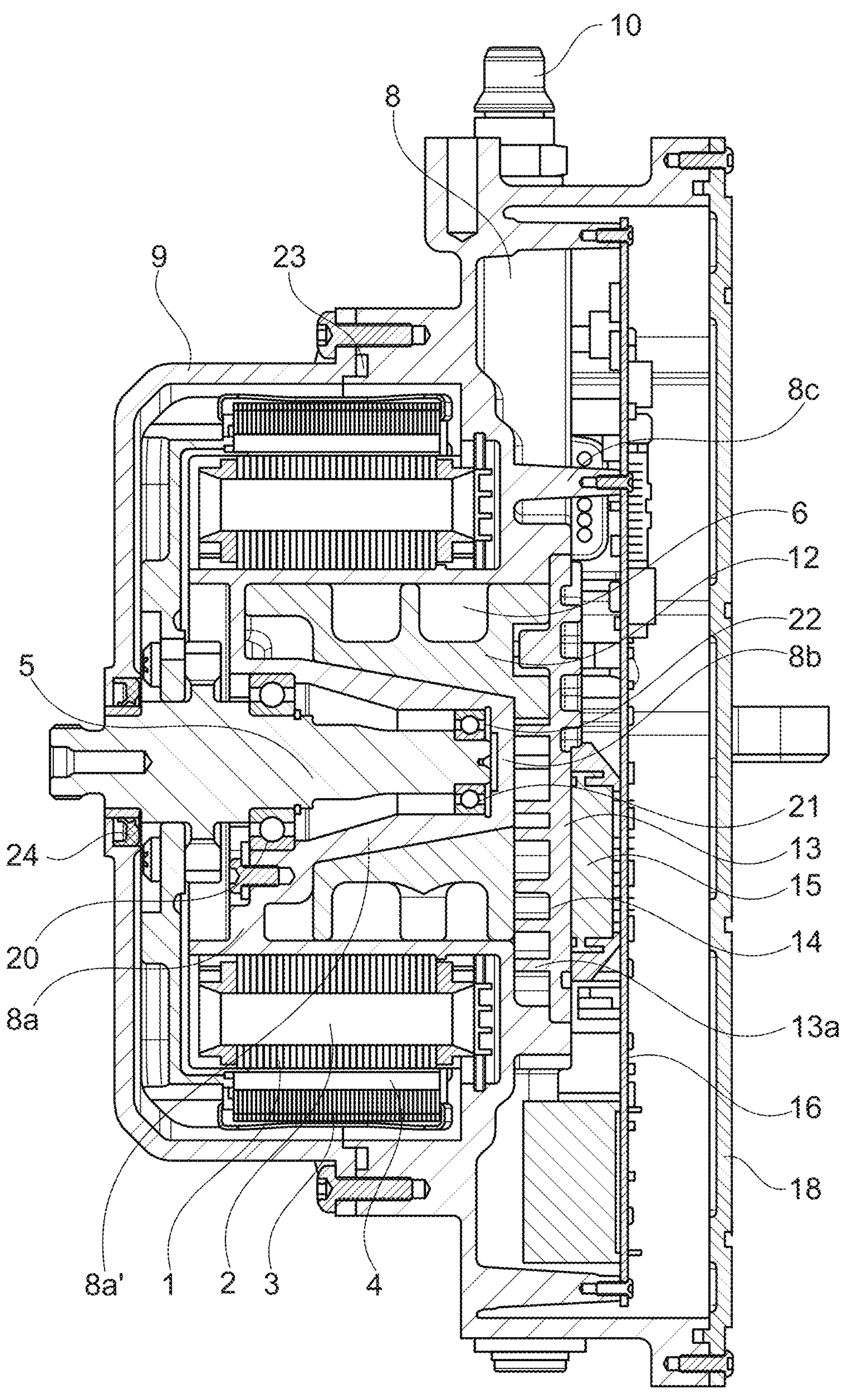
FIG. 1 shows a sectional view of an example of an electric motor.

The electric motor shown in FIG. 1 comprises a stator 1 with stator windings 2, a rotor 3 with permanent magnets 4 surrounding the stator 1, a shaft 5 connected to the rotor 3 in a rotationally fixed manner and a cooling channel 6, which leads through an interior space surrounded by the stator 1. Rotor 2 and stator 1 are arranged in a housing which comprises a first housing component 8 and a second housing component 9. A first end of the shaft 5 is arranged in the housing. A second end of the shaft 5 protrudes from the housing.

Figure 2:
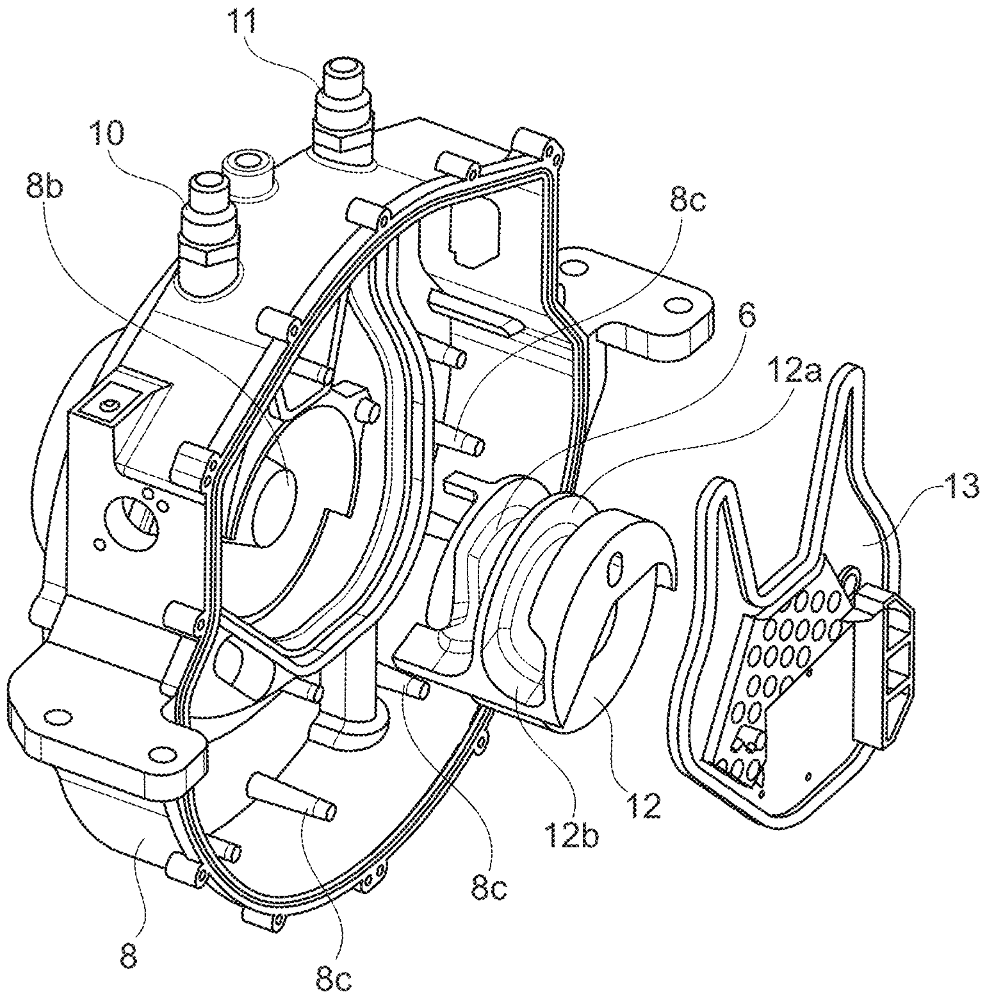
FIG. 2 shows three parts defining the cooling channel of the electric motor.

The first housing component 8 forms a base which is opposite a first axial end of the stator 1, while the second housing component 9 is a cover opposite a second axial end of the stator 1. The first housing component 8 is also shown in FIG. 2 and may have an inlet 10 and an outlet 11 for cooling liquid.

The first housing component 8 has an inner part **8*a* that protrudes into the stator 1. This inner part 8*a* forms a sleeve 8*a*', in which the first end of the shaft 5 is arranged, and an annular space, which is arranged between the stator 1 and the sleeve. A section 6 of the cooling channel runs in this annular space in order to cool the stator 1. Two bearings 20, 21 of the shaft 5 are arranged in the sleeve 8*a*' formed by the inner part 8*a*. The section of the cooling channel 6 running in the annular space thus cools the stator 1 on the one hand and the bearings 20, 21** on the other.

The shaft 5 has different diameters. A first bearing 21, which may be arranged closer to the end of the shaft 5 located in the housing than a second bearing 20, therefore has a smaller internal bearing diameter than the second bearing 20. In the embodiment shown, the second bearing 20 is designed as a fixed bearing. The second bearing 20 rests on the one hand against a stop formed by the housing component 8, more precisely against a stop formed by the housing inner part 8*a*, and on the other hand against a stop formed by the shaft 5. In the embodiment shown, the first bearing 21 is designed as a floating bearing which is resiliently pressed against a stop formed by the shaft 5, for example with a spring washer 22. The different diameters thus allow simple assembly, namely in that the bearings 20, 21 are pushed onto the shaft 5 and then the shaft 5 is pushed into the housing inner part 8*a*.

An insert 12 is arranged in the annular space of the inner part 8*a* of the first housing component 8, which together with the inner part 8*a* defines the cooling channel section 6 for cooling the stator 1. The insert 12 may have one rib 12*a* or several ribs 12*a* which extend in the circumferential direction, i.e. are oriented in the circumferential direction, and along which the cooling channel section 6 runs. Alternatively or additionally, the insert 12 can also have one or more ribs 12*b*, which extend in the axial direction in the annular space, i.e. are oriented in the axial direction, and along which the cooling channel section 6 runs.

The first housing component 8 carries a plate 13, which encloses the insert 12 in the annular space. The plate 13 can be welded to the first housing component 8 or attached to it in some other way, for example by soldering or screwing.

In the embodiment shown in FIG. 1, the plate 13 defines a further cooling channel section 14 between itself and the insert 12. This further cooling channel section 14 cools an electronic component 15, for example a transistor switch, of an electronic control unit that controls the power supply to the stator windings 2. In the embodiment example shown, the further cooling channel section 14 is arranged upstream of the cooling channel section 6 for cooling the stator 1, but can also be arranged downstream of it. The cooling channel section 6 for cooling the stator 1 is therefore connected downstream of the further cooling channel section 14 for cooling the electronic component 15. In this way, efficient cooling may be achieved. The first housing component 8 carries a printed circuit board 16 on which the control electronics are arranged. The electronic component 16 is arranged on a side of the printed circuit board 16 facing the plate 13 and rests against the plate 13. The plate 13 is therefore a cooling plate for one or more components of the control electronics.

The plate 13 can have protrusions 13*a* on its side facing away from the electronic component 15, which protrude into the further cooling channel section 14 and thus improve heat dissipation from the plate 13. The printed circuit board 16 is covered by a cover, for example a cover plate 18, and enclosed in a space delimited by the first housing component 8 and the cover.

The printed circuit board 16 can be attached to the first housing component 8 using screws. Other mechanical fastenings, such as adhesive bonding, are also possible. The first housing component 8 may have domes 8*c* on which the printed circuit board 16 sits.

The inner part 8*a* of the first housing component 8 can have a cylindrical outer surface. However, for production as a casting, it may be advantageous if the outer surface of the inner part 8*a* is conical in shape and defines a cone angle of less than 20°, for example less than 10°.

The housing may be designed as a sealed housing, for example in that a seal 23 is pressed between the first housing component 8 and the second housing component 9 and the shaft 5 is guided out of the second housing component 9 surrounded by a shaft seal 24.

Figure 3:
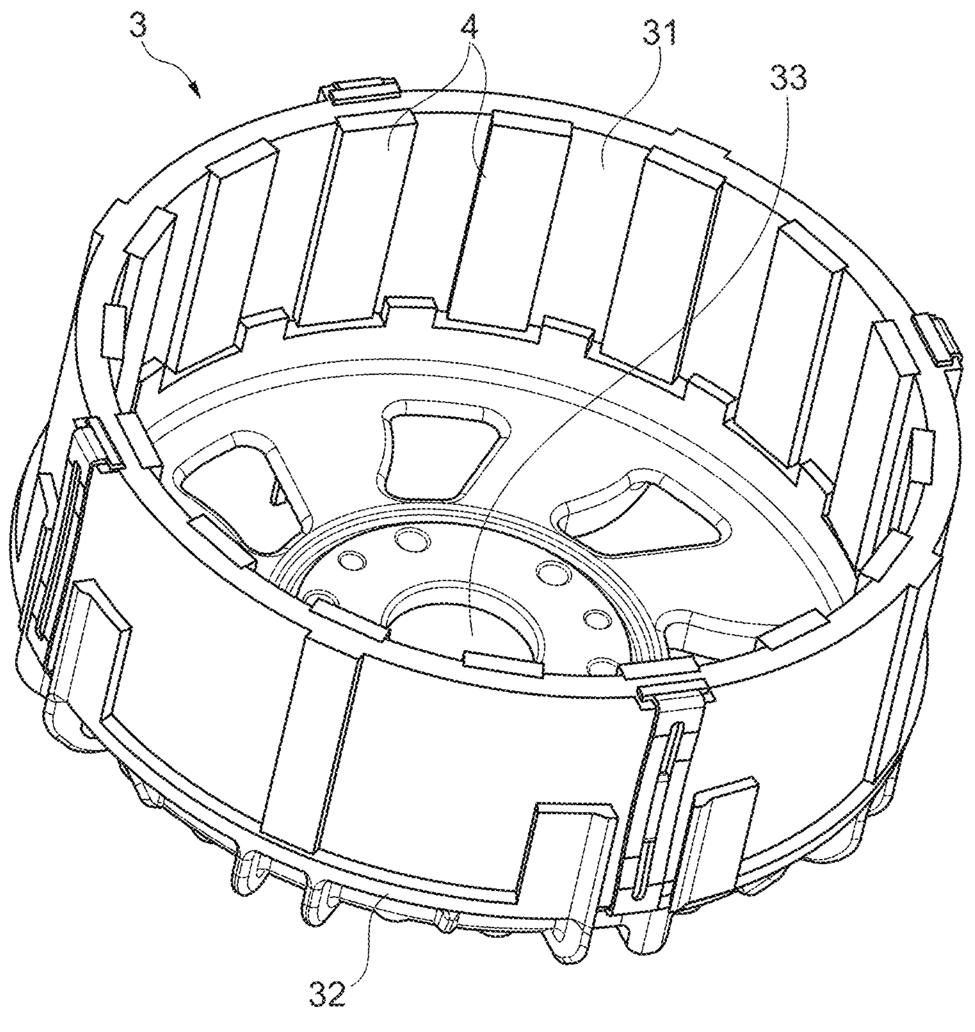
FIG. 3 shows a view of the rotor of the electric motor shown in FIG. 1.

The rotor 3 of the electric motor described above is shown in FIG. 3. The rotor 3 has a back iron ring 31, to the inside of which permanent magnets 4 are attached, and a carrier 32, which is attached to the back iron ring 31 and has an opening 33 through which the shaft 5 protrudes. The opening 33 forms a hub for the shaft. In the embodiment example shown, the shaft 5 may be screwed to the carrier 32, if the carrier 32 is made of aluminum-based alloy. However, the carrier 32 may also be welded to the shaft, if the carrier 32 is made of steel. The back iron ring 31 can be formed as a stack of sheets, for example of electrical steel or other soft magnetic steel. The individual sheets of this stack of sheets can be ring-shaped; however, sheets can also be used which each form only one segment of a ring.

In the embodiment shown in FIG. 1, the inner part 8*a* of the first housing component 8 comprises a sleeve base 8*b*. The sleeve base 8*b* is thus formed integrally with the inner part 8*a* and the first housing component 8. However, the sleeve base 8*b* can also be a separate component that is attached to the first housing component 8. For example, the plate 13 can form a base of the sleeve 8*a'*.

Figure 4:
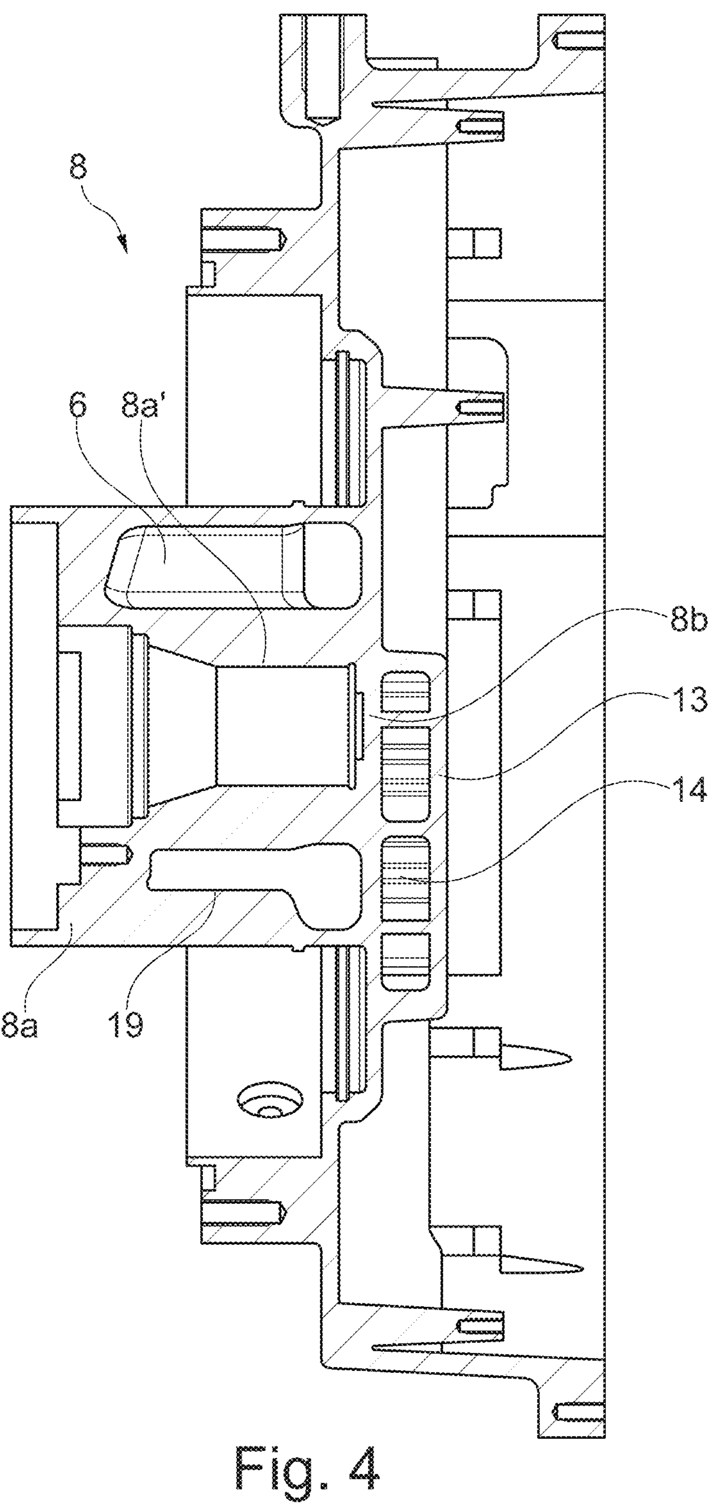
FIG. 4 shows a housing component of a further embodiment of an electric motor.

FIG. 2 shows three components which together define sections 6, 14 of the cooling channels. These three components are the first housing component 8, the insert 12 and the plate 13. However, these three components 8, 12, 13 can also be formed in one piece. FIG. 4 shows a corresponding embodiment of the first housing component 8. As in the embodiment of FIGS. 1 and 2, the first housing component 8 has an inner part 8*a* which projects into the stator 1 and forms a sleeve 8*a'* with a sleeve base 8*b*, in which one end of the shaft 5 is arranged. The inner part 8*a* of the first housing component 8 forms an annular space, which is arranged between the stator 1 and the sleeve 8*a'* and in which a cooling channel section 6 extends. The inner part 8*a* has a rib 19, which extends in the axial direction in the annular space and along which the cooling channel section 6 runs for cooling the stator 1. In addition, the inner part 8*a* also forms the further cooling channel section 14 for cooling an electronic component 15 and has a plate 13 against which the electronic component 15 rests, as shown in FIG. 1.

The invention claimed is:

1. An electric motor comprising a stator, which comprises stator windings, a rotor surrounding the stator and comprising permanent magnets, a shaft connected to the rotor, a housing surrounding the rotor and the stator, and a cooling channel which leads through an interior space surrounded by the stator, wherein the shaft has a first end, which is arranged in the housing, and a second end, which protrudes out of the housing, the housing comprises a first housing component, which forms a base opposite a first axial end of the stator, and a second housing component opposite a second axial end of the stator as a cover, and the first housing component has an inlet and an outlet for cooling liquid and an inner part which projects into the stator, the inner part forms a sleeve, in which the first end of the shaft is arranged, and the inner part also forms an annular space which is arranged between the stator and the sleeve, wherein a cooling channel section for cooling the stator extends in this annular space, the shaft has different diameters and the shaft is mounted in the sleeve formed by the inner part with a first bearing, which is arranged closer to the first end of the shaft than a second bearing and has a smaller bearing inner diameter than the second bearing, and wherein the first bearing is a fixed bearing and the second bearing is a floating bearing.

2. The electric motor according to claim 1, wherein the floating bearing is resiliently pressed against a stop formed by the shaft.

3. The electric motor according to claim 1, wherein the floating bearing is pressed by a spring washer against a stop formed by the shaft.

4. The electric motor according to claim 1, wherein an insert is arranged in the annular space, which together with the inner part defines the cooling channel section.

5. The electric motor according to claim 4, wherein the first housing component carries a plate which encloses the insert in the annular space.

6. The electric motor according to claim 5, wherein the plate forms a base of the sleeve.

7. The electric motor according to claim 5, wherein the plate defines a further cooling channel section between itself and the insert, and the first housing component carries a printed circuit board with control electronics for controlling the power supply to the stator windings, the printed circuit board carrying, on a side facing the plate, an electronic component which bears against the plate.

8. The electric motor according to claim 7, wherein the plate carries protrusions on a side facing away from the electronic component, which protrusions project into the further cooling channel section.

9. The electric motor according to claim 7, wherein the further cooling channel section is arranged upstream of the cooling channel for cooling the stator.

10. The electric motor according to claim 1, wherein the inner part has a cylindrical or a conical outer surface which defines a cone angle of less than 20°.

11. The electric motor according to claim 1, wherein a sealing ring is arranged between the first housing component and the second housing component.

12. The electric motor according to claim 1, wherein the rotor has a stack of laminations, to the inside of which the permanent magnets are attached, and a carrier, via which the stack of laminations is connected to the shaft.

13. The electric motor according to claim 12, wherein the carrier has an opening through which the shaft projects.

14. The electric motor according to claim 1, wherein the shaft protrudes from the second housing component.

15. The electric motor according to claim 4, wherein the insert has at least one rib which extends in the circumferential direction and along which the cooling channel section for cooling the stator runs.

16. The electric motor according to claim 1, wherein the first housing component has at least one rib which extends in the axial direction in the annular space and along which the cooling channel section for cooling the stator runs.

* * * * *